US012737315B2

(12) United States Patent
Maier et al.

(10) Patent No.: US 12,737,315 B2
(45) Date of Patent: Sep. 15, 2026

(54) INTERFACE COMPONENT FOR DISTRIBUTED COMPONENTS OF A MACHINE LEARNING SYSTEM

(71) Applicant: Fraunhofer-Gesellschaft zur Förderung der angewandten Forschung e.V., Munich (DE)

(72) Inventors: Andreas Maier, Erlangen (DE); Richard Schielein, Erlangen (DE); Christopher Syben-Leisner, Erlangen (DE); Dana Pfeufer, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/675,103

(22) Filed: May 27, 2024

(65) Prior Publication Data

US 2024/0311325 A1 Sep. 19, 2024

Related U.S. Application Data

(63) Continuation of application No. PCT/EP2022/083555, filed on Nov. 28, 2022.

(30) Foreign Application Priority Data

Nov. 29, 2021 (DE) ........................ 102021213418.1

(51) Int. Cl.
*G06F 13/40* (2006.01)

(52) U.S. Cl.
CPC ................................ *G06F 13/4068* (2013.01)

(58) Field of Classification Search
CPC .................................................. G06F 13/4068
(Continued)

(56) References Cited

U.S. PATENT DOCUMENTS 8,379,913 B1 * 2/2013 Robinson ............... G06V 20/13 707/918
10,104,016 B2 * 10/2018 Takeuchi ............. H04L 1/0009
(Continued)

FOREIGN PATENT DOCUMENTS

DE 112018001085 T5 11/2019
WO 2020205597 A1 10/2020

OTHER PUBLICATIONS

Germany Office Action issued in corresponding Germany Patent Application No. 102021213418.1 dated Aug. 26, 2022, pp. 1-8.
(Continued)

*Primary Examiner* — Christopher B Shin
(74) *Attorney, Agent, or Firm* — PV IP PC; Wei Te Chung

(57) ABSTRACT

An interface component is provided. The interface component includes a parameter determination unit configured to determine one or several configuration parameters of an associated unit of a distributed system in dependence on first feedback data of a successor interface component, and wherein the parameter determination unit is configured to change a configuration of the associated unit by means of the one or several configuration parameters. Further, the interface component includes a feedback determination unit configured to determine second feedback data and transmit or transfer the same to a predecessor interface component.

20 Claims, 7 Drawing Sheets

(58) Field of Classification Search
USPC .......................................................... 710/104
See application file for complete search history.

(56) References Cited

U.S. PATENT DOCUMENTS

| | | | | |
|---|---|---|---|---|
| 2004/0143428 | A1 * | 7/2004 | Rappaport | G06F 30/18 703/22 |
| 2013/0051621 | A1 | 2/2013 | Robinson | |
| 2020/0234179 | A1 * | 7/2020 | Lore | G06N 5/02 |
| 2021/0319098 | A1 | 10/2021 | Pogorelik | |
| 2022/0019410 | A1 * | 1/2022 | Cangea | G06F 8/33 |
| 2022/0261631 | A1 * | 8/2022 | Cohen | G06N 20/00 |
| 2023/0135737 | A1 * | 5/2023 | Lu | G06F 21/64 706/12 |

OTHER PUBLICATIONS

International Search Report in International application No. PCT/EP2022/083555, mailed on Feb. 24, 2023.
Written Opinion of the International Search Authority in International application No. PCT/EP2022/083555, mailed on Feb. 24, 2023.

* cited by examiner

INTERFACE COMPONENT FOR DISTRIBUTED COMPONENTS OF A MACHINE LEARNING SYSTEM

CROSS-REFERENCE TO RELATED APPLICATIONS

This application is a continuation of copending International Application No. PCT/EP2022/083555, filed Nov. 28, 2022, which is incorporated herein by reference in its entirety, and additionally claims priority from German Application No. 102021213418.1, Nov. 29, 2021, which is also incorporated herein by reference in its entirety.

The application relates to an interface component for distributed components of a system, a method and a computer program, in particular an interface component for distributed components of a machine learning system.

BACKGROUND OF THE INVENTION

Typical conventional distributed systems can comprise, for example, elements such as data generators (sensors), actuators and processors (hardware and software), share information in a predetermined sequence and process the same according to previously defined criteria or by means of pre-parametrized hardware implementations or algorithms. In current systems, when changing the generation and processing chain (e.g., degeneration of an element, replacement of a defect element), the entire system has to be adapted manually or automatically from the outside.

In such an adaptation of the system, in conventional systems, a change has to be detected in a step separate from the system and an adaptation to a predetermined application purpose has to be performed and to be distributed to the individual elements. Such an adaptation can be performed, for example by means of metrics such as a figure of merit or the same, based on which the new parameterization is estimated.

In addition, when designing a respective system, it has to be considered that a change can be made by adding a novel, previously non-existing component into the system or by changing the application purpose. Currently, for adapting the system to general changes, the elements and in particular the adjustable parameters have to be known in advance. Thus, generally, in conventional systems, there is currently no option of designing the same such that they are optimum for a previously determined application purpose or that the same can adapt to changed circumstances, such as the replacement of an element, addition of an element or a functionality or a change of the application purpose.

Existing systems can already be monitored. Therefore, based on the used metrics, changes of the adjustable parameters of the elements can be performed. However, such changes are generally not performed in an optimum manner towards a global target, but follow previously determined rules for a deviation of the considered metrics and are applied to the individual components in a dedicated manner. Further, typical conventional systems basically do not have the ability to adapt dynamically to changes within the system, such as degeneration, replacement or addition of novel components and to adjust independently to a novel optimum global target. Instead, potential future changes have to be considered and anticipated already when designing the system.

SUMMARY

According to an embodiment, an interface component may have: a parameter determination unit configured to determine one or several configuration parameters of an associated unit of a distributed system in dependence on first feedback data of a successor interface component, and configured to change a configuration of the associated unit by means of the one or several configuration parameters, and a feedback determination unit configured to determine second feedback data and transfer the same to a predecessor interface component, wherein the first feedback data depend on previous output data of the associated unit, wherein the first feedback data are suitable to change the previous output data to obtain changed output data, or wherein the first feedback data indicate the changed output data, wherein the feedback determination unit is configured to determine the second feedback data such that the second feedback data depend on the first feedback data, wherein the second feedback data are suitable for changing previous input data for the associated unit, or wherein the second feedback data indicate changed input data for the associated unit, wherein the previous input data are data or depend on data that have been captured or measured by means of a technical device; and/or wherein the associated unit is a technical device whose technical configuration is set by one or several configuration parameters; and/or wherein the second feedback data are configured to contribute to a change of one or several further configuration parameters of a technical configuration of a technical device.

According to another embodiment, an apparatus may have: an inventive interface component and the associated unit, wherein the interface component and the associated unit are associated with each other.

According to another embodiment, a system may have: an inventive apparatus, the predecessor unit of the inventive apparatus, and the successor unit of the inventive apparatus.

According to another embodiment, a system may have: a plurality of inventive apparatuses, wherein the plurality of apparatuses include a first inventive apparatus, a second inventive apparatus and a third inventive apparatus, wherein the associated unit of the first apparatus is a predecessor unit of the associated unit of the second apparatus, wherein the associated unit of the third apparatus is a successor unit of the associated unit of the second apparatus, wherein the interface component of the third apparatus is configured to transmit its second feedback data to the interface component of the second apparatus, which are received by the interface component of the second apparatus as first feedback data, and wherein the interface component of the second apparatus is configured to transmit its second feedback data to the interface component of the first apparatus, which are received by the interface component of the first apparatus as first feedback data.

According to another embodiment, a method may have: a parameter determination unit of an interface component determining one or several configuration parameters of an associated unit of a distributed system in dependence on first feedback data of a successor interface component and changing a configuration of the associated unit by means of the one or several parameters, and a feedback determination unit of the interface component determining second feedback data and transferring the same to a predecessor interface component, wherein the first feedback data depend on previous output data of the associated unit, wherein the first feedback data are suitable to change the previous output data to obtain changed output data, or wherein the first feedback data indicate the changed output data, wherein the feedback determination unit determines the second feedback data such that the second feedback data depend on the first feedback data, wherein the second feedback data are suitable for changing previous input data for the associated unit, or wherein the second feedback data indicate changed input data for the associated unit, wherein the previous input data are data or depend on data that have been captured or measured by means of a technical device; and/or wherein the associated unit is a technical device whose technical configuration is set by one or several configuration parameters; and/or wherein the second feedback data are configured to contribute to a change of one or several further configuration parameters of a technical configuration of a technical device.

Another embodiment may have a non-transitory digital storage medium having a computer program stored thereon to perform the inventive method, when said computer program is run by a computer.

According to an embodiment, an interface component is provided. The interface component includes a parameter determination unit configured to determine one or several configuration parameters of an associated unit of a distributed system in dependence on first feedback data of a successor interface component, and wherein the parameter determination unit is configured to change a configuration of the associated unit by means of the one or several configuration parameters. Further, the interface component includes a feedback determination unit that is configured to determine second feedback data and to transfer the same to a predecessor interface component. The first feedback data depend on previous output data of the associated unit, wherein the first feedback data are suitable to change the previous output data to obtain changed output data, or wherein the first feedback data indicate the changed output data. Further, the feedback determination unit is configured to determine the second feedback data such that the second feedback data depend on the first feedback data and on previous input data for the associated unit, wherein the second feedback data are suitable for changing previous input data for the associated unit, or wherein the second feedback data indicate changed input data for the associated unit. The previous input data are data or depend on data that have been captured or measured by means of a technical device; and/or the associated unit is a technical device whose technical configuration is set by the one or several configuration parameters; and/or the second feedback data are configured to contribute to a change of one or several further configuration parameters of a technical configuration of a technical device.

Further, a method according to an embodiment is provided. The method includes:

a parameter determination unit of an interface component determining one or several configuration parameters of an associated unit of a distributed system in dependence on first feedback data and changing a configuration of the associated unit by means of the one or several configuration parameters. And:

a feedback determination unit of the interface component determining second feedback data and transferring the second feedback data to a predecessor interface component.

The first feedback data depend on previous output data of the associated unit, wherein the first feedback data are suitable to change the previous output data to obtain changed output data, or wherein the first feedback data indicate the changed output data. The feedback determination unit determines the second feedback data such that the second feedback data depend on the first feedback data and on previous input data for the associated unit, wherein the second feedback data are suitable for changing previous input data for the associated unit, or wherein the second feedback data indicate changed input data for the associated unit. The previous input data are data or depend on data that have been captured or measured by means of a technical device; and/or the associated unit is a technical device whose technical configuration is set by the one or several configuration parameters; and/or the second feedback data are configured to contribute to the change of one or several further configuration parameters of a technical configuration of a technical device.

Further, a computer program is provided that includes commands that prompt, when the computer program is executed by a computer or by a signal processor, the same to perform the above-described method.

In some embodiments, sensors, actuators, processors (apart from hardware also programs) are arranged as a distributed learning system, wherein each element of the system has an interface (also referred to as interface component). These respective interface components can be configured, for example, such that the overall system is adjusted to a global target in an optimum manner, for example, using a defined metric. For example, an interface according to an embodiment can provide for learning of individual adjustable parameters of the elements.

In some embodiments, the interface component can be configured, for example, to ensure that the needed gradient chain is not interrupted by individual non-trainable elements.

A distributed learning system according to specific embodiments can be configured, for example, to adjust optimally, for example independently to changes, such as a degeneration of individual elements, a replacement of defect elements as well as an addition of novel elements.

In some embodiments, for example, the change of the global target amount can significantly change the characteristics and efficiency of the overall system after the distributed system has adjusted itself to the new target amount in an optimum manner.

In order to allow the overall communication within a distributed learning system according to specific embodiments, the interface components can use, for example, information on applied physics or previous mathematical knowledge on the respective system elements.

Some of the embodiments provide a distributed learning system where several elements are connected via interfaces.

In specific embodiments, interfaces are provided that have further functionality apart from classical interface functions that ensures the ability to learn of the individual element as well as the overall system.

A distributed system according to an embodiment can comprise one or several of the following elements: a web server; one or several sensors, for example one or several X-ray sensors, one or several X-ray sensors, one or several ultrasound sensors; one or several cameras; Lidar; one or several microphones; radar; one or several laser systems; one or several diodes; one or several computers with sensory components; transmission channels for information, for example one or several telephone lines, one or several telescopes; one or several information channels in Shannon's sense; one or several transmission channels for information with the ability of latching information, wherein temporal immediacy in the information transmission is not needed.

Interface components of specific embodiments can be configured, for example, to connect distributed elements to one system and contribute to adjust the overall system to an application case in an optimum manner. In embodiments, the interface component can be configured to obtain or to revert to the optimum adjustment of the system also when individual elements are degenerated or replaced for a specific application case.

According to some embodiments, the interface can further be configured to allow the introduction of new elements and the subsequent readjustment of the system to a global target without any specific knowledge about a new element and its characteristics. Thereby, distributed training of modular components can be realized without disclosing their specification. In particular, this can enable the exact modeling or simulating of the physical or mathematical behavior in the respective individual modules.

BRIEF DESCRIPTION OF THE DRAWINGS

Embodiments of the present invention will be detailed subsequently referring to the appended drawings, in which.

DETAILED DESCRIPTION OF THE INVENTION

In the following, specific embodiments will be described.

Figure 1:
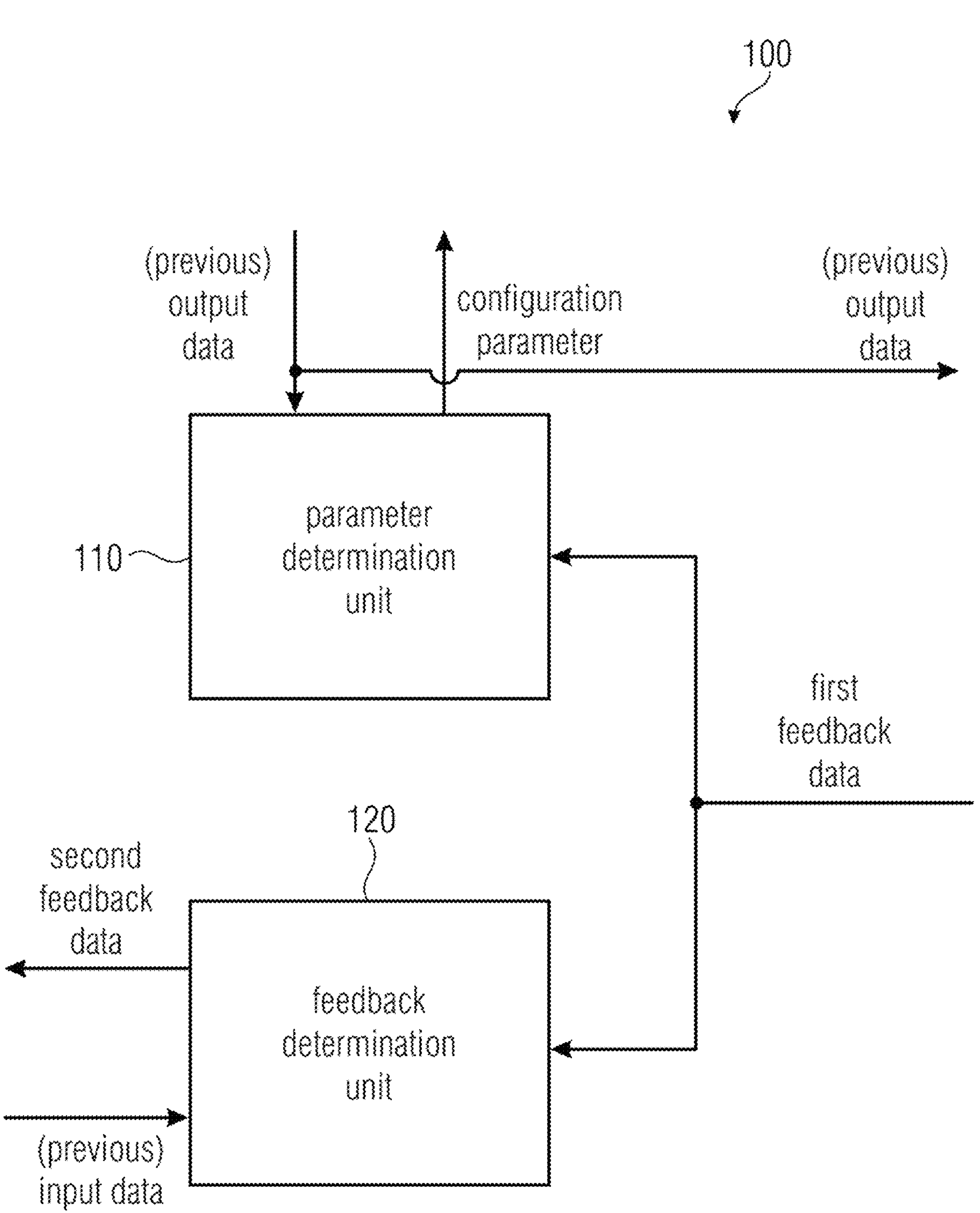
FIG. 1 shows an interface component according to an embodiment.

FIG. 1 shows an interface component 100 according to an embodiment.

The interface component 100 includes a parameter determination unit 110 that is configured to determine one or several configuration parameters of an associated unit 150 of a distributed system in dependence on first feedback data of a successor interface component 160, and wherein the parameter determination unit 110 is configured to change a configuration of the associated unit 150 by means of the one or several configuration parameters.

Further, the interface component 100 includes a feedback determination unit 120 that is configured to determine second feedback data and to transfer the same to a predecessor interface component 90.

The first feedback data depend on previous output data of the associated unit 150, wherein the first feedback data are suitable to change the previous output data to obtain changed output data or wherein the first feedback data indicate the changed output data.

The feedback determination unit 120 is configured to determine the second feedback data such that the second feedback data depend on the first feedback data and on previous input data for the associated unit 150, wherein the second feedback data are suitable for changing previous input data for the associated unit 150, or wherein the second feedback data indicate changed input data for the associated unit 150.

The previous input data are data or depend on data that are captured or measured by means of a technical device; and/or the associated unit 150 is a technical device whose technical configuration is set by the one or several configuration parameters; and/or the second feedback data are configured to contribute to the change of one or several further configuration parameters of a technical configuration of a technical device.

Figure 2:
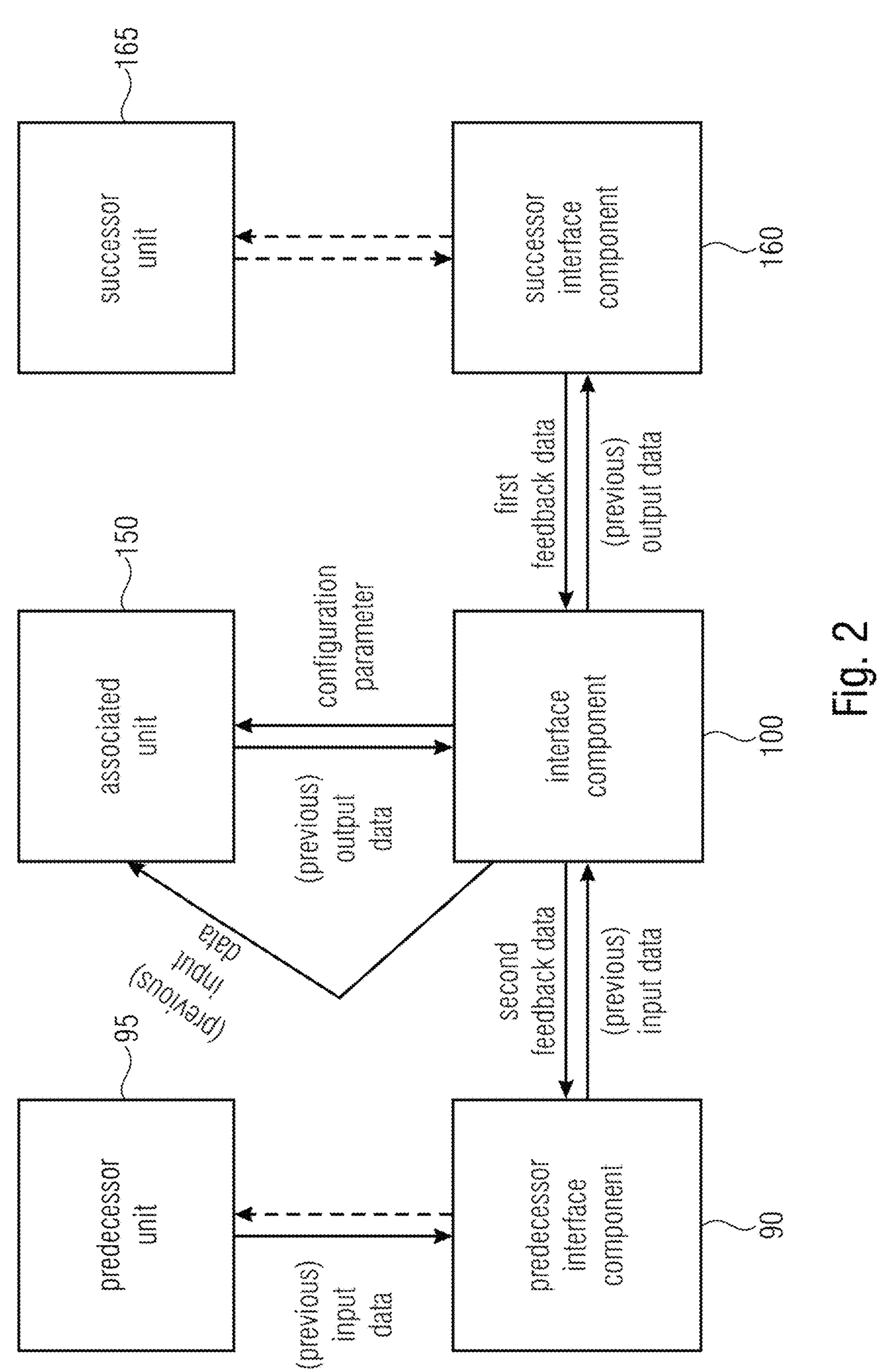
FIG. 2 illustrates the interface component of the embodiment of FIG. 1 with its associated unit, with the predecessor unit, with the predecessor interface component with the successor unit and with the successor interface component.

FIG. 2 illustrates the interface component 100 of the embodiment of FIG. 1 together with its associated unit 150, with the predecessor unit 95, with the predecessor interface component 90, with the successor unit 165 and with the successor interface component 160.

Figure 3:
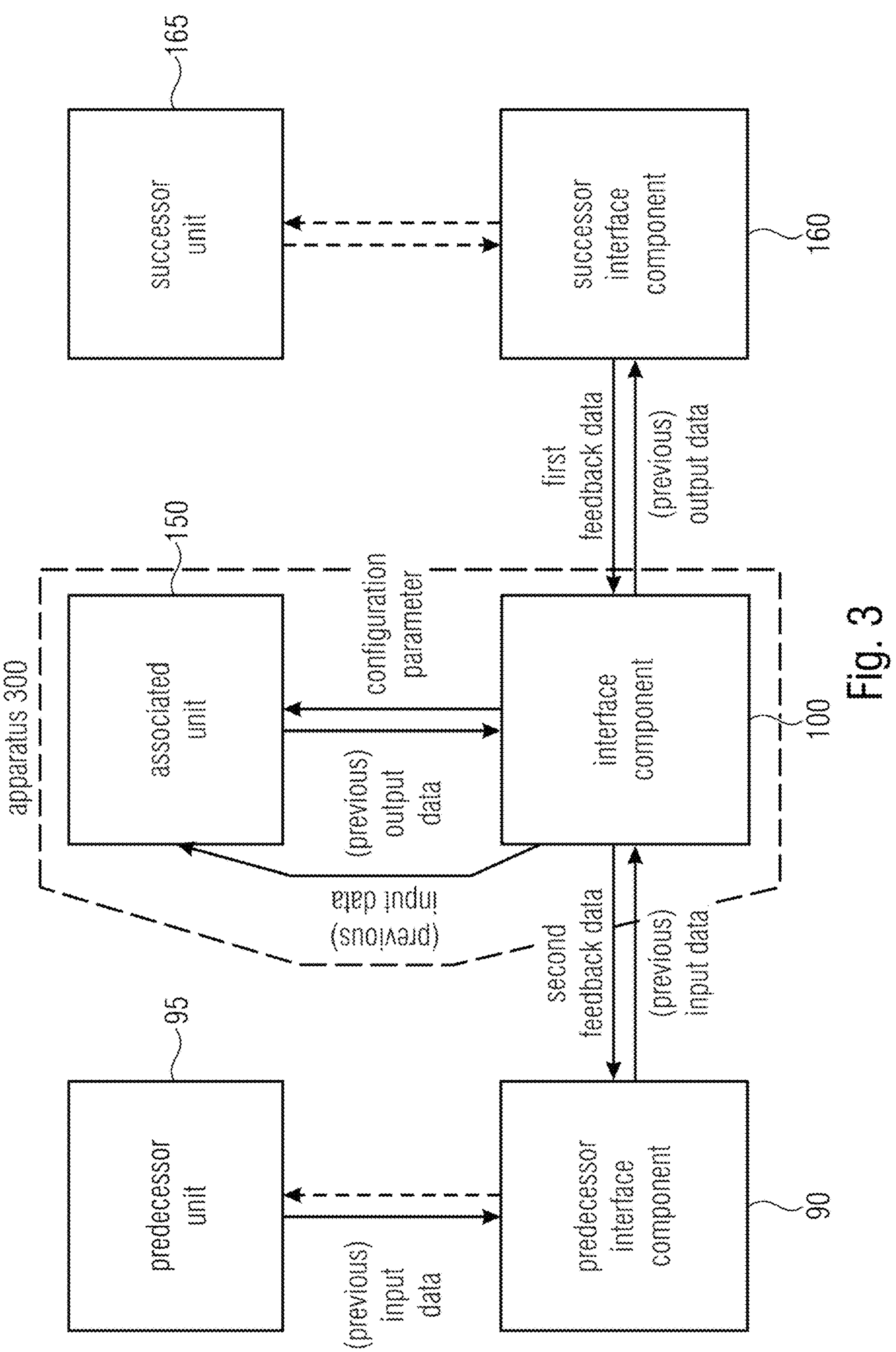
FIG. 3 shows an apparatus according to an embodiment including the interface component of FIG. 1 and the associated unit of the interface component.
Figure 4:
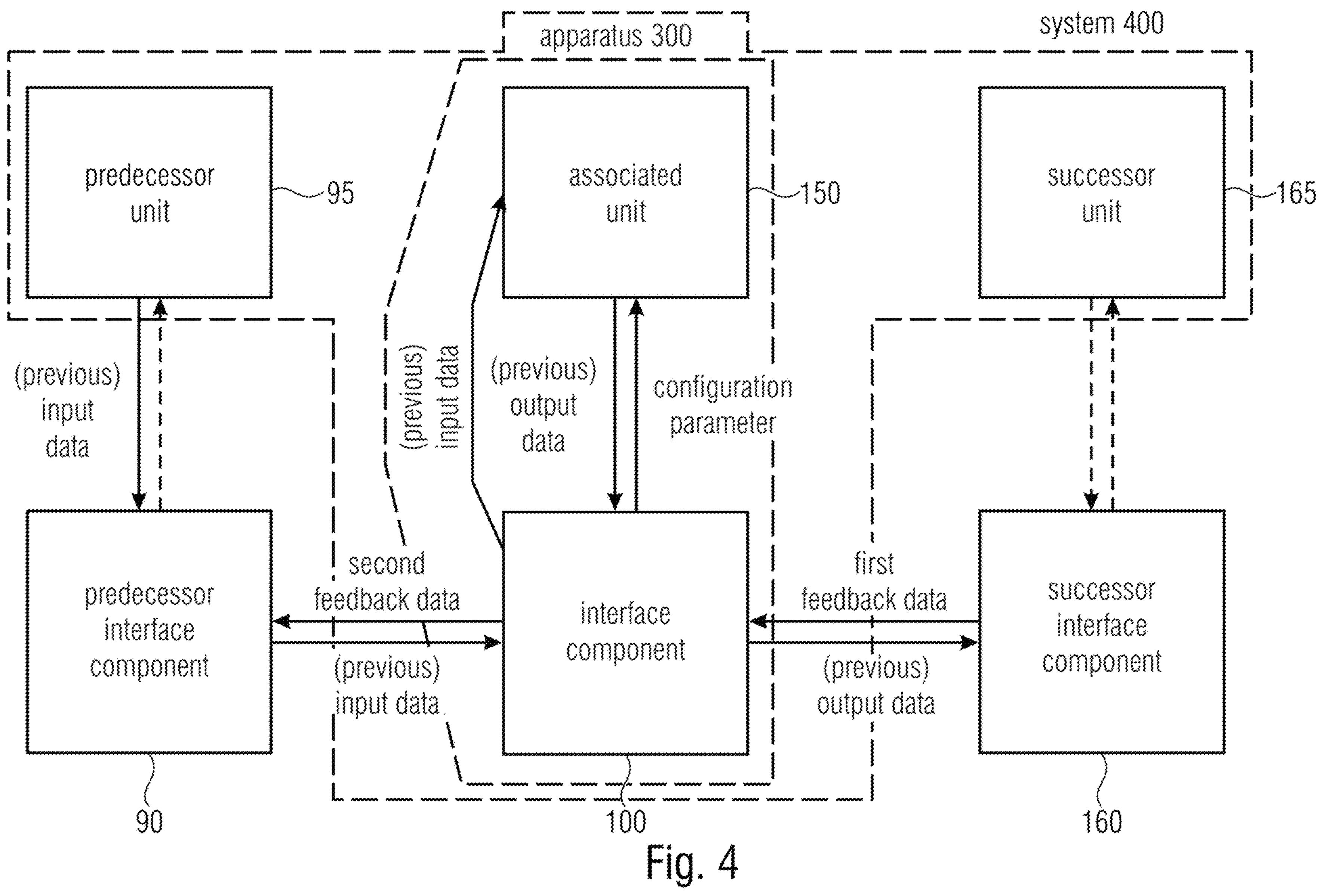
FIG. 4 shows a system according to an embodiment including the apparatus of FIG. 3 and the predecessor unit of the apparatus of FIG. 3.
Figure 5:
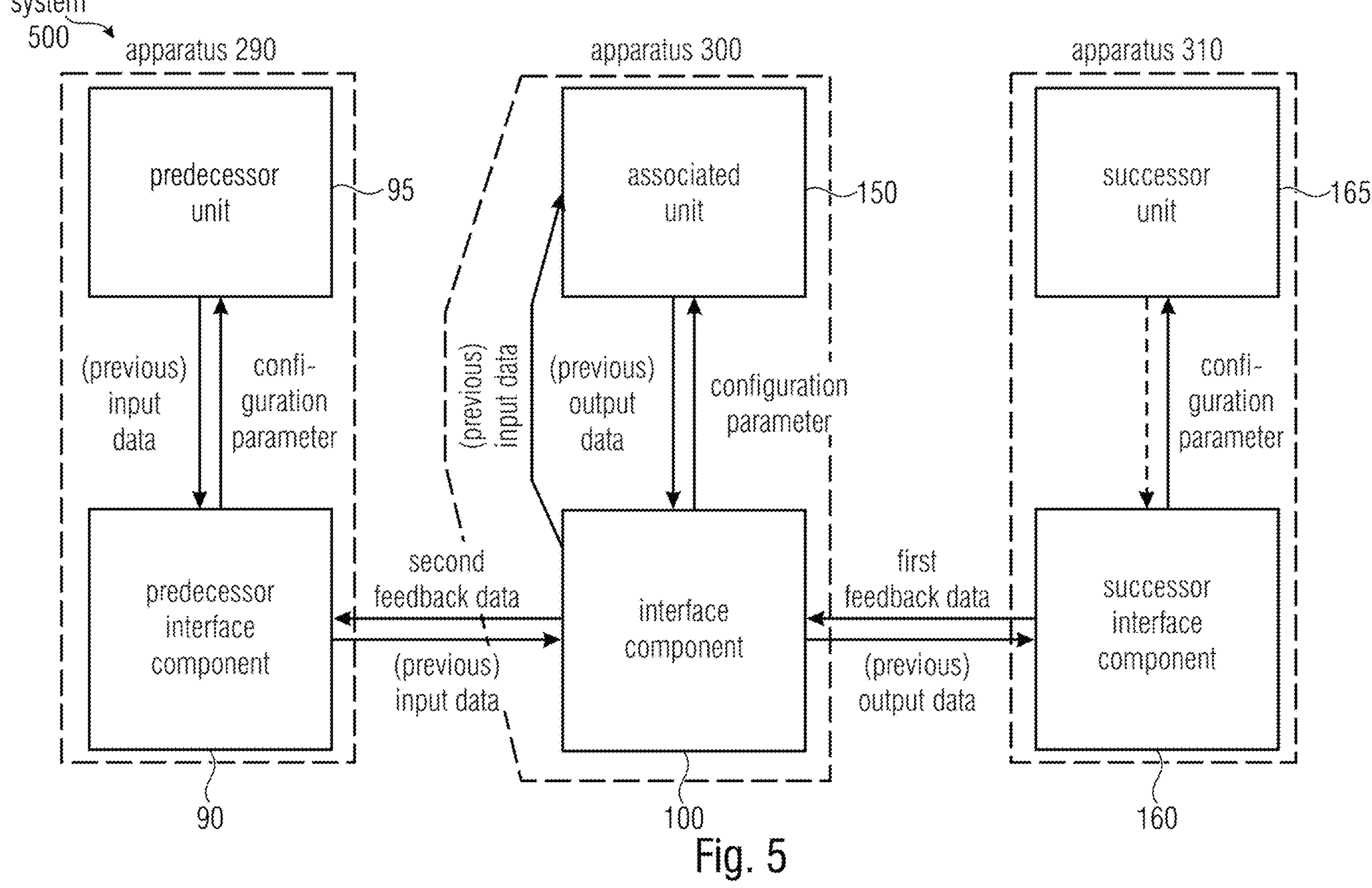
FIG. 5 shows a further system according to an embodiment including a plurality of the apparatuses of FIG. 3.

The embodiment of FIG. 2 shows that the (previous) input data that have been generated by the predecessor unit 95 are transmitted by the predecessor unit 95 to the predecessor interface component 90, that the predecessor interface component 90 transmits the (previous) input data to the interface component 100 and that finally the interface component 100 transmits the (previous) input data to the associated unit 150. The same data flow for the (previous) input data is also illustrated in FIG. 3, FIG. 4 and FIG. 5.

According to another embodiment, the (previous) input data that have been generated by the predecessor unit 95 can instead be transmitted directly from the predecessor unit 95 to the associated unit 150. In this case, it can be provided that the (previous) input data are then transmitted by the associated unit 150 to the interface component 100. Such an embodiment can also be used in the embodiments of FIG. 3, FIG. 4 and FIG. 5.

In a further embodiment, it can be provided that the (previous) input data are transmitted directly to the associated unit 150 by the predecessor unit 95 and that the (previous) input data are transmitted directly to the interface component 100 by the predecessor interface component 90. In this case, the interface component 100 and the associated unit 150 do not have to transmit the (previous) input data any longer. Such an embodiment can also be used in the same way in the embodiments of FIG. 3, FIG. 4 and FIG. 5.

Figure 6:
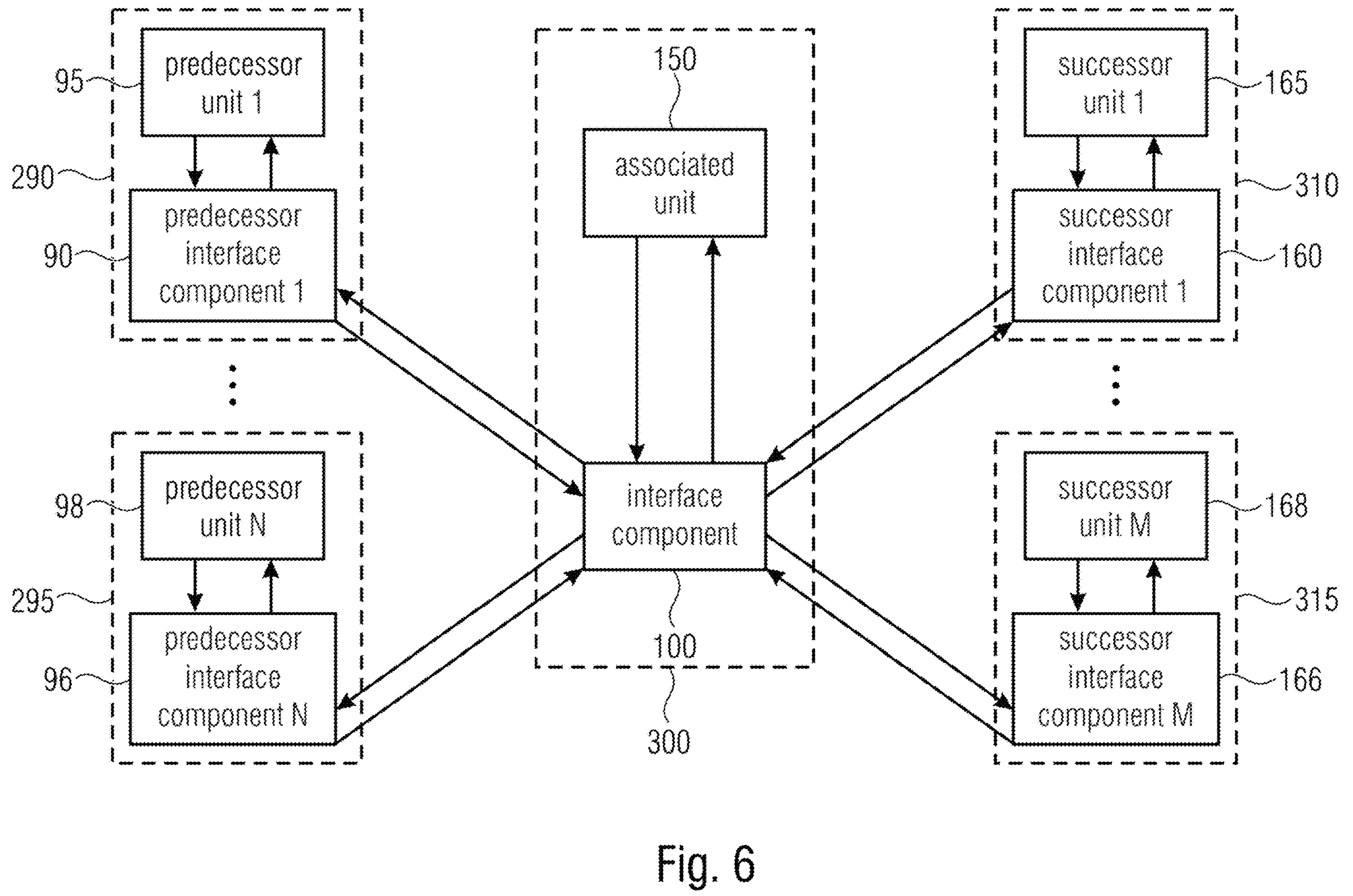
FIG. 6 shows a further system according to an embodiment, further including at least one further apparatus with a further predecessor interface component and a further predecessor unit and at least one further apparatus with a further successor interface component and a further successor unit.
Figure 7:
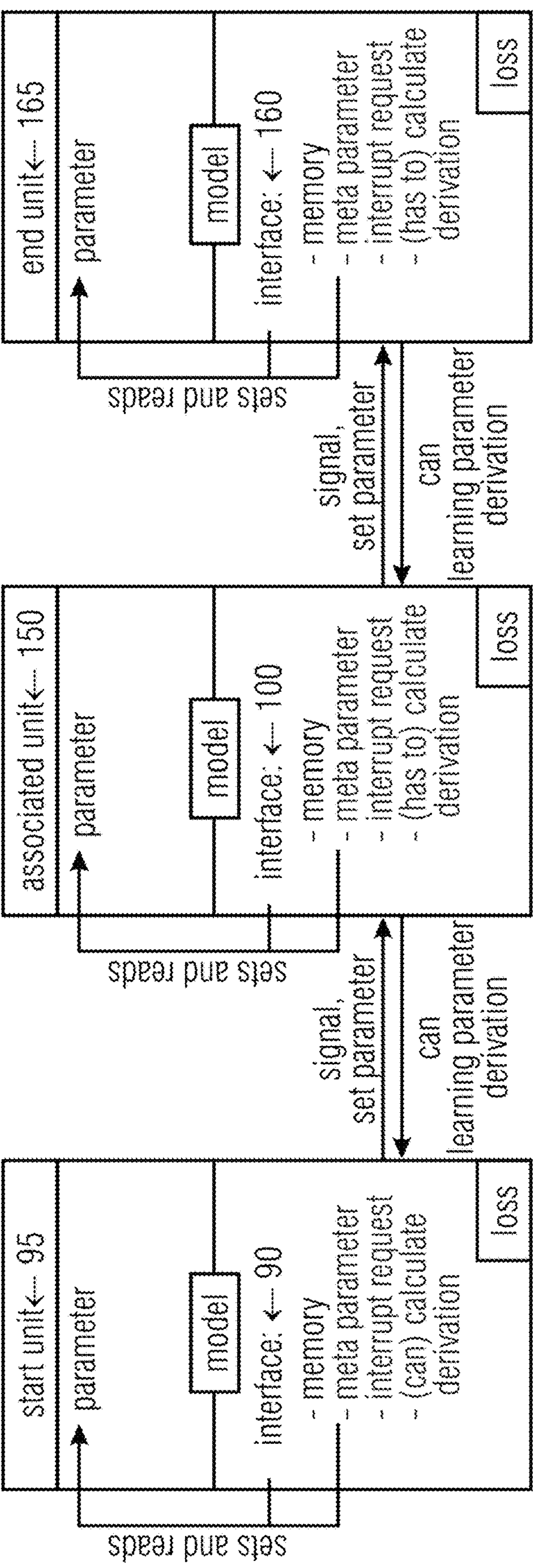
FIG. 7 shows a system according to a further embodiment with an interface component and its associated unit with a predecessor interface component and the predecessor unit and with a successor interface component and its associated unit.

The above embodiments apply accordingly to the embodiments of FIGS. 6 and 7.

Thus, in a first embodiment, the previous input data can have been generated, for example, by the predecessor unit 95 to which the predecessor interface component 90 is associated and the same can have been transmitted to the predecessor interface component 90 for transfer to the interface component 100. Here, the interface component 100 can be configured, for example, to receive the previous input data from the predecessor interface component 90. For example, the interface component 100 can be configured to transmit the previous input data to the associated unit 150.

According to a second embodiment, therefore, the previous input data can have been generated by the predecessor unit 95 to which the predecessor interface component 90 is associated and can have been transmitted directly to the associated unit 150 by the predecessor unit, wherein the interface component 100 can be configured, for example, to obtain or receive the previous input data from the associated unit 150.

Therefore, in a third embodiment, the previous input data can have been generated by the predecessor unit 95 to which the predecessor interface component 90 is associated and can have been transmitted to the predecessor interface component 90 for transfer to the interface component 100, and the interface component 100 can be configured to receive the previous input data from the predecessor interface component 90. Here, the previous input data can have been transmitted directly by the predecessor unit 95 to the associated unit 100, wherein the interface component 100 can then be configured to not transmit the previous input data to the associated unit 100 (as the same already receives the previous input data directly from the predecessor unit 95).

According to an embodiment, the interface component 100 can be configured, for example, to receive the previous output data from the associated unit 150. Here, the interface component 100 can be configured, for example, to transmit the previous output data to a successor interface component 160 that is associated with a successor unit (165).

In one embodiment, the previous input data can have been generated, for example, by the predecessor unit 95, to which, for example, the predecessor interface component 90 can be associated and can have been transmitted to the predecessor interface component 90 for transfer to the interface component 100.

According to an embodiment, the interface component 100 can be configured, for example, to transmit the previous input data to the associated unit 150.

In one embodiment, the feedback determination unit 120 can be configured, for example, to determine the second feedback data such that the second feedback data depend on the first feedback data and on the previous input data for the associated unit 150.

According to an embodiment, the feedback determination unit 120 can be configured, for example, to generate the second feedback data in dependence on the one or several configuration parameters.

In one embodiment, the feedback determination unit 120 can be configured, for example, to generate the second feedback data in dependence on the one or several configuration parameters after the same have been changed by the parameter determination unit 110.

According to an embodiment, the feedback determination unit 120 can be configured, for example, to determine the second feedback data in dependence on the first feedback data and in dependence on which output data the associated unit 150 generates in response to a reception of different input data.

In one embodiment, the feedback determination unit 120 can be configured, for example, to determine the second feedback data in dependence on the first feedback data and in dependence on which output data the associated unit 150 generates in response to the reception of the different input data with constant configuration by means of constant one or several configuration parameters.

According to an embodiment, the feedback determination unit 120 can be configured, for example, to determine the second feedback data in dependence on an error function or a loss function.

In one embodiment, the feedback determination unit 120 can be configured, for example, to generate the second feedback data by using machine learning.

According to an embodiment, the feedback determination unit 120 can be configured, for example, to generate the second feedback data as differential data that indicate a difference between the changed input data and the previous input data or the feedback determination unit 120 can be configured, for example, to determine the second feedback data such that the same indicate a first or higher derivation that depends on the changed input data and on the original input data.

In one embodiment, the feedback determination unit 120 can be configured, for example, to use quantization for generating the second feedback data.

According to an embodiment, the parameter determination unit 110 can be configured, for example, to determine the one or several configuration parameters of the associated unit 150 in dependence on the first feedback data and in dependence on which output data the associated unit 150 generates with different configurations by means of different one or several configuration parameters.

In one embodiment, the parameter determination unit 110 can be configured, for example, to determine the one or several configuration parameters of the associated unit 150 in dependence on the first feedback data and in dependence on which output data the associated unit 150 generates in response to a reception of input data that are kept constant with different configurations by means of different one or several configuration parameters.

According to an embodiment, the parameter determination unit 110 can be configured, for example, to determine the one or several configuration parameters in dependence on an error function or a loss function.

In one embodiment, the parameter determination unit 110 can be configured, for example, to generate the one or several configuration parameters by using machine learning.

According to an embodiment, the parameter determination unit 110 can be configured, for example, to generate the one or several configuration parameters as differential data that indicate a difference between the changed input data and the previous input data or the parameter determination unit 110 can be configured, for example, to determine the second feedback data such that the same indicate a first or higher derivation that depends on the changed input data and on the original input data.

In one embodiment, the interface component 100 can be configured, for example, to associate the first feedback data to the previous output data based on an identifier.

According to an embodiment, the feedback determination unit 120 can be configured, for example, to output an identifier that indicates to which previous input data the second feedback data relate.

In one embodiment, the previous input data and the changed input data can be, for example, two-dimensional or higher-dimensional data; and/or the previous output data and the changed output data can be, for example, two-dimensional or higher-dimensional data.

According to an embodiment, the previous input data and the changed input data can be, for example, two-dimensional image data; and/or the previous output data and the changed output data can be, for example, two-dimensional image data.

In one embodiment, the previous input data and the changed input data can be, for example, audio data; and/or the previous output data and the changed output data can be, for example, audio data.

According to an embodiment, the previous input data and the changed input data can be, for example, data in the frequency range; and/or the previous output data and the changed output data can be, for example, data in the frequency range.

In one embodiment, the previous input data and the changed input data can be, for example, data of a pressure sensor.

According to an embodiment, the interface component 100 can be realized, for example, in hardware.

In one embodiment, the interface component 100 can be realized, for example, as plug.

According to an embodiment, the associated unit 150 can be, for example, a technical device for capturing or measuring whose technical configuration is set by the one or several configuration parameters.

FIG. 3 shows an apparatus 300 according to an embodiment.

The apparatus 300 of FIG. 3 includes an interface component 100 according to one of the above embodiments.

Further, the apparatus 300 of FIG. 3 includes the associated unit 150 of the apparatus, wherein the interface component and the associated unit 150 are associated with each other.

FIG. 4 shows a system 400 according to an embodiment.

The system 400 includes the above-described apparatus 300 of FIG. 3.

Further, the system 400 of FIG. 4 includes the predecessor unit 95 of the apparatus of FIG. 3.

Further, the system 400 of FIG. 4 includes the successor unit 165 of the apparatus of FIG. 3.

FIG. 5 shows a further system 500 according to an embodiment.

The system includes a plurality of the apparatuses according to FIG. 3, including a first apparatus 290, a second apparatus 300 and a third apparatus 310 according to FIG. 3.

The associated unit of the first apparatus 290 is a predecessor unit 95 of the associated unit 150 of the second apparatus 300.

The associated unit of the third apparatus 310 is a successor unit 165 of the associated unit 150 of the second apparatus 300.

The interface component of the third apparatus 310 (the successor interface component 160 of the second apparatus 300) is configured to transmit its second feedback data to the interface component 100 of the second apparatus 300, which are received by the interface component 100 of the second apparatus as first feedback data.

Further, the interface component 100 of the second apparatus 300 is configured to transmit its second feedback data to the interface component of the first apparatus 290 (the predecessor interface component 90 of the second apparatus 300), which are received by the interface component of the first apparatus 290 as first feedback data.

FIG. 6 shows a further system 500 according to an embodiment, which further includes at least one further apparatus 295 with a further predecessor interface component 96 and with a further predecessor unit 98. Further, the system 500 further includes at least one further apparatus 315 with a further successor interface component 166 and with a further successor unit 168.

The interface component of the fifth apparatus 315 is configured to submit its feedback data to the interface component 100 of the second apparatus 300, which are received by the interface component 100 of the second apparatus 300 as further first feedback data.

The parameter determination unit 110 of the interface component 100 of the second apparatus 300 is configured to determine the one or several configuration parameters of the associated unit 150 of the distributed system in dependence on the further first feedback data.

The feedback determination unit 120 of the interface component 100 of the second apparatus 300 is configured to determine further second feedback data and to transmit the same to the further predecessor interface component 96 of the fourth apparatus 295.

The further first feedback data depend on further previous output data of the associated unit 150, wherein the further first feedback data are suitable for changing the further previous output data to obtain further changed output data or wherein the further first feedback data indicate the further changed output data.

The feedback determination unit 120 is configured to determine the further second feedback data such that the further second feedback data depend on the further first feedback data and on further previous input data for the associated unit 150, wherein the further second feedback data are suitable for changing further previous input data for the associated unit 150, or wherein the further second feedback data indicate further changed input data for the associated unit 150.

The interface component 100 of the second apparatus 300 is configured to transmit its further second feedback data to the interface component 96 of the fourth apparatus 295, which are received by the interface component of the fourth apparatus 295 as first feedback data.

According to an embodiment, the system 400 of FIG. 4 or the system 500 of FIG. 5 or the system of FIG. 6 can be, for example, a distributed system.

In one embodiment, the distributed system can comprise, for example, one or several of the following components:

- a web server;
- one or several sensors, for example, one or several X-ray sensors and/or one or several X-ray sensors and/or one or several ultrasound sensors; one or several cameras;
- Lidar;
- one or several microphones;
- radar;
- one or several laser systems;
- one or several diodes;
- one or several computers with sensory components;
- transmission channels for information, for example, one or several telephone lines, one or several telescopes; one or several information channels in Shannon's sense;
- one or several transmission channels of information with the ability of latching information, wherein temporal immediacy in the information transfer is not needed.

In specific embodiments, the interface components can be part of each element of the distributed learning system. Such an element can be, for example, a data source, a processor or also an information transmission channel in Shannon's sense. For example, each element having an interface component can be integrated in the system.

In specific embodiments, the interface component 100 can have one or several of the following characteristics:

In some embodiments, the interface component 100 can implement, for example, an inference, i.e., the source elements transmit signals via the interface component 100 to defined elements of the distributed system. The end sink element can provide, for example, the prediction of the overall system.

In specific embodiments, the interface components 100 in the distributed learning system comprise, for example, a physical or virtual address. For example, the distributed learning system can (e.g., additionally) be topologically structured via the addresses of the interface component 100.

In some embodiments, an interface component 100 can comprise, for example, N input ports (the same do not have to be physically realized, the same can also be implemented in a virtual manner) and M output ports (the same also do not have to be physically present), wherein M can be equal to N, or wherein M can differ from N. By such an interface component 100, for example, more complex system topologies can be realized, such as a Siamese network or a system realizing multi-task learning.

According to some embodiments, the interface component 100 can read and set, for example, parameters of the linked elements (e.g., via a digital channel) when the element comprises such parameters.

In some embodiments, the interface component 100 can be configured to receive one or several first or higher derivations of one or several other elements (e.g., by one or several successor interface components). For example, said one or said several other elements can calculate such first or higher derivations and transmit the same to the interface component 100. These can be, for example, one or several first or higher derivations of data, which the one or several other elements have received from the interface or from a unit 150 associated with the interface. By the one or several first or higher derivations, for example, said one or several other elements can provide feedback to the interface how the data that have been transmitted by the interface or the associated unit 150 should have been changed in order to achieve a better result.

In some embodiments, the interface component 100 can be configured to calculate one or several first or higher derivations with respect to the input of a linked/connected element (e.g., with respect to the input of a predecessor unit) and can be configured, for example, to provide the one or several first or higher derivations for the element and/or for other elements (e.g., the predecessor unit or the predecessor units) of the distributed system. In particular, when the interface component 100 is, for example, part of a start source element (or, for example, associated with a start source element), the interface element will frequently not determine a first or higher derivation for another element of the distributed system, in particular, when in this case there are no input data from a (e.g., predecessor) unit, which the interface element has received, to which one or several derivations could be calculated.

If, for example, an associated element does not change the information, i.e., when identity mapping exists, there is no need to determine a respective first or higher derivation.

The interface component 100 can change parameters of the linked element (associated unit 150). For this, for example, the partial derivation with respect to the parameter to be updated can be determined with the help of the received derivation and the current input signal, and the parameter can be updated by considering the present meta parameters.

In one embodiment, the interface component 100 can have, for example, meta parameters that can be read and set via a digital channel and which can influence the update step of the element parameters.

The interface component 100 can include a memory to keep the input signal for parameter update steps as well as to store meta parameters.

In one embodiment, the interface component 100 can provide the output signal of the linked element, for example, on request of an interface component 100 linked to another element. This breaks the temporal immediacy of parameter update and needed input signal.

According to an embodiment, the interface component 100 can provide a loss function. This loss function can be, for example, settable and hence changeable.

In some embodiments, it can be provided, for example, that an end sink element provides such a loss function and that all other elements of such a distributed system can provide further loss functions via the interface component 100 to allow intermediate losses and regularizations. Start and intermediate elements can transmit, for example, the intermediate losses to the end element in order to be able to determine an overall loss and hence overall gradient for the system. For this, in some embodiments, start, intermediate and end elements can receive label data for monitored learning via the interface component 100. These labels can be existing data of a data storage but can also be input at run time by a person.

FIG. 7 shows a respective system according to a further embodiment with an interface component 100 and its associated unit 150, with a predecessor interface component 90 and the predecessor unit 95 and with a successor interface component 160 and its associated unit 165.

In some embodiments, for example, elements that have linked an interface component 100 as described above can be combined into a distributed learning system. For example, the interface component 100 can be configured such that the derivations are distributed and propagated by the overall system via a digital channel to each element linked to the interface component 100. In that way, in one embodiment, with the help of the gradient influence, for example, all involved interface components 100 can direct the respective linked element (respective linked associated unit 150) and hence all elements existing in the system in an optimum manner towards a global target.

According to some embodiments, an element having such an interface component 100 can be incorporated into one or several already existing systems. In some embodiments, by the interface components 100, a new distributed learning overall system can readjust to a global target. This means if the newly introduced element has parameters adjustable via the interface component 100, these parameters of the new elements can be adjusted in an optimum manner. With a change of the overall system by the newly introduced element, according to some embodiments, the interface components 100, will adapt, for example, their respective elements such that the newly developed overall system is adjusted to a global target in an optimum manner. This optimum state can differ from the previous state as the newly introduced elements can change the optimum operating point with respect to the global target. According to some embodiments, the interface component 100 does not need to consider such changes of the overall system when designing the system, as the distributed learning system can dynamically readjust to changes by considering the global target. If the newly introduced element has no parameters adjustable by the interface component 100, in some embodiments, the interface component 100 ensures at least that a gradient flow through the system is possible and hence the distributed system as a whole remains trainable.

In one embodiment, the interface component 100 can have information on applied physics or previous mathematical knowledge on the linked element in order to provide a needed or requested first or higher derivation.

A derivation is easy to determine when a function that the element maps or applies to the input signals can be differentiated. Here, it is sufficient when a valid sub-gradient is provided via the interface component 100.

In some embodiments, all elements (independent of the producer or the same) have the ability as a system to orient themselves towards a global target (e.g., figure of merit) (to optimize itself). Here, in some embodiments, it is no longer needed to decide a priori which elements are combined into a system. According to some embodiments, system elements can react to the change (including failure, replacement, wear or addition of a new different element) of other disjoint elements, such that under the condition of the figure of merit, still, an optimum or almost optimum result is obtained. Changing the figure of merit can have a significant influence on the behavior of the system, wherein no consideration is needed in the phase of constructing/designing the units/components.

Some embodiments cannot be trained and the partial derivation with respect to the input data is provided via the interface component 100. Such units/components can be configured, for example, in an AI ready manner.

Some embodiments can be trainable, for example, and the partial derivation with respect to the input data and the learnable parameters is provided via the interface component 100. Such units/components can be configured, for example, with full AI.

In some embodiments, for example, an interface definition is provided. In further embodiments, for example, a (hardware) interface is provided.

In some embodiments, for example, machine learning can be used.

In further embodiments, inventive units/components are provided. Some embodiments provide an inventive bus system and/or an inventive web server. In particular, some embodiments realize a degree of independency of the system elements.

According to some embodiments, in addition to the transmission of data via an inventive interface, respective distributed learning is enabled.

In the following, specific embodiments of the invention will be described.

The following specific embodiments represent, among others, specific embodiments of the interface component 100 of FIG. 1. Even when for the sake of a clearer description, reference is not continuously made explicitly to the parameter determination unit 110 and the feedback determination unit 120 of the interface component 100 of FIG. 1, it is obvious that configuration parameters of the associated unit 150 are or can be determined by a parameter determining unit 110 of the interface component 100 of FIG. 1, and that feedback data to a predecessor unit 95, for example, differential images are or can be determined by a feedback determination unit 120 of the interface component 100 of FIG. 1.

A first specific embodiment relates to driver assistance systems or systems for supporting autonomous driving.

In such an example, a camera is provided as a first unit that provides an (current) camera image of a front perspective of the car. For example, the camera can provide a two-dimensional image of the road in front of the car. The camera image can be, for example, a color image or, for example, a gray image. Any image dimensions are possible. For the example, it is merely exemplarily assumed that the input image is an RGB color image having a pixel resolution of 1200×900 pixel. This means each of the 1200×900 pixel has a red value, a green value and a blue value. An inventive first interface component is associated with the first unit.

The first unit or the first interface component transfers the RGB camera image with the respective pixel resolution to a second unit, which is configured for image denoising and performs respective noise suppression. A respective conventional suitable noise suppression filter can be used. The second unit provides a respectively noise-suppressed image, which could have, for example, the same pixel resolution as the input image, i.e., 1200×900 pixel. In the noise-suppressed image, a series of pixels can have, for example, different noise-suppressed gray scale pixel than the input image. An inventive second interface component is associated with the second unit.

The second unit or the second interface component transmits the noise-suppressed image to a third unit for road detection. The same detects a road in the noise-suppressed image, such as a road side, for detecting a road side, again, conventional pattern recognition technologies can be used. As a result of the road detection, it can be intended, for example, to provide a road-detected image comprising a two-dimensional image, wherein each pixel of the two-dimensional image assumes a binary value (for example 0 or 1). In that way, a pixel corresponding to the road side could be marked by 1 in a binary image and a pixel not corresponding to the road side could be marked by 0. Merely exemplarily, it will be assumed herein that the road-detected image with the binary data has a different pixel resolution than the noise-suppressed image, such as 600×450 pixel. An inventive third interface component is associated with the third unit.

The third unit or the third interface component transfers the noise-suppressed image to a forth unit for steering control. The forth unit for steering control determines, based on the detection of the road side in the road-detected image, how far steering control to the left or to the right should be performed. If the road-detected image gives the impression that the car is 10 cm too far right at the right road side, the steering wheel control could perform counter control towards the left and, for example, output a steering command resulting in the rotation of the steering wheel by 15° to the left. An inventive fourth interface component is associated with the fourth unit.

After performing the control command for steering wheel control, the fourth unit can determine at a suitable later time, for example two seconds after implementing the steering command, how the distance to the road side has changed after implementing the steering command. Thus, for example, the fourth unit could now determine that the car is 5 cm too far to the left from the right road side. From this, it can then be inferred that the steering command has steered too far to the left.

The erroneous control with the steering command can basically have two reasons. On the one hand, the algorithm in the fourth unit that has derived the control command from the distance to the road side might have reacted too strongly and should be adapted, for example by changing one or several parameters. On the other hand, it can also be the case that the position of the road side has been indicated wrongly. In an embodiment, one or several parameters for determining the steering command are adapted in the fourth unit. On the other hand, it is also determined at what position the road side would have had to be located in the third data transmitted by the third unit or by the third interface component so that the fourth unit would have output a better steering command.

In a first embodiment, information of the improved position determination of the road side is oriented how the algorithm in the third unit was adjusted prior to adapting its parameters to the determination of the change of the new distance to the road side.

In a second embodiment, the adaptation of the parameters of the steering command algorithm can also be implemented such that the oversteering in response to the distance to the road side is not completely compensated, for example, based on the assumption that the error when determining the steering command could also be based on wrong data determination of a predecessor unit 95. In such a case, the information of the improved position determination of the road side could also be oriented towards the fact how the algorithm in the third unit is adjusted after adapting its parameters in response to the determination of the change of the new distance to the road side.

Both the first and the second embodiment can perform such that the same change the road-detected image several times, such that the determined position of the road side is shifted. A loss function or error function can be used to optimize a resulting steering command that depends on the road side shifted in the image towards the steering command considered to be better. In that way, by minimizing the error function, the final improved road-detected image can be determined. The above first and second embodiments differ merely with regard to the effect of the changed road-detected image on the resulting steering command.

In a third embodiment, the information of the improved position determination of the road side will be between the result of the first embodiment and the result of the second embodiment. For example, the improved position of the road side can be determined according to the first and second embodiments and subsequently linear weighting, for example, averaging is performed.

The improved position of the road side is returned to the third interface component by the fourth interface component. This can take place by determining a derivation, for example the first derivation with respect to the data provided by the third unit or by its interface component and the improved data. Thus, for example, a difference between the road-detected image (binary image; 600×450 pixel) and an improved road-detected image (also a binary image; 600×450 pixel) is determined by indicating, for all pixels that are to be changed in the road-detected image to obtain the improved road-detected image, the differential value by which the respective pixels are to be changed. As the road-detected image in the present example are binary data, it is sufficient to indicate each pixel that is to be changed to obtain the improved road-detected image, for example by 1; all other of the 600×450 pixel have then, for example, the value 0.

In the case of determining the first derivation, a road detection differential image, which represents a differential image between an improved road-detected image and the (original) road-detected image, is returned to the third interface.

In response to receiving the road detection differential image, the third interface component can proceed analogously to the fourth interface component: From the road detection differential image, it can be inferred that, on the one hand, the algorithm for road detection of the third unit is to be improved and/or that the noise-suppressed image itself, which the second unit had generated and that had been transmitted to a third unit, was erroneous.

Again, in the third unit, one or several parameters of the algorithm for road detection can be adapted, such that in response to receiving the noise-suppressed image, the improved road-detected image should be generated. The improved road-detected image itself can be determined from the (original) road-detected image and the obtained road detection differential image. For this, as described above, an error function or loss function can be used.

Further, the obtained noise-suppressed image can be improved by aiming to obtain the improved error detected image by optimizing an error function or loss function, wherein either the previous or the adapted parameters of the algorithm for road detection are used in the third unit. The improved noise-suppressed image is again generated when dimensioning the originally obtained noise-suppressed image, in the example 1200×900 gray scale pixel. Finally, again, a noise-suppression differential image can be generated by forming the difference of the improved noise-suppressed image and the original noise-suppressed image, wherein this noise-suppression differential image represents a first derivation or gradient with respect to the improved noise-suppressed image and the originally obtained noise-suppressed image.

Alternatively, the noise-suppression differential image, for example represented by Matrix $B_{diff,ns}$ can also be generated directly during the optimization of the error function or the optimization of the loss function, by determining the same within the optimization function. If the improved noise-suppressed image, represented by Matrix $B_{impr,ns}$ is determined in the optimization and represents itself a parameter of the optimization function, $B_{impr,ns}$ can be determined by the maximum sum of the original noise-suppressed image $B_{original,ns}$ and $B_{diff,ns}$. If, in the error function, $B_{impr,ns}$ is replaced by $B_{original,ns}+B_{diff,ns}$, then $B_{diff,ns}$ can be equally determined, as $B_{original,ns}$ is known.

The same applies analogously for the above-described determination of the road detection differential image and for any other determination of the gradient, for example a differential image: The above described determination of the road detection differential image can equally take place directly in the error function or loss function without needing a previous determination of the improved road-detected image.

Basically, an error function for determining the improved noise-suppressed image can be designed as follows. The predecessor component provided the improved road-detected image $B_{impr,road}$. In the third unit, the algorithm $A_{road}$ is known, which determines a current road-detected image $B_{current,road}$ from a current noise-suppressed image $B_{current,ns}$:

$$B_{current,road} = A_{road}(B_{current,ns}, p_{Aroad}),$$

wherein $p_{Aroad}$ indicates the one or several parameters of the algorithm for road detection.

The error function defines, for example:

$$\text{Error measure } (B_{current,road} - B_{impr,road}) \rightarrow 0$$

$$\text{Error measure } (A_{road}(B_{current,ns}, p_{Aroad}) - B_{impr,road}) \rightarrow 0$$

Now, $B_{current,ns}$ is optimized, wherein $A_{road}$, $p_{Aroad}$, $B_{impr,road}$ are known and remain static during optimization.

The improved noise-suppressed image $B_{impr,road}$ is now the current noise-suppressed image $B_{current,ns}$, the error measure ($A_{road}$ ($B_{current,ns}$, $p_{Aroad}$)$-B_{impr,road}$)$\rightarrow$0 is optimized. In one embodiment, this is the first found $B_{current,ns}$, for which Error measure ($A_{road}$ ($B_{current,ns}$, $p_{Aroad}$)−$B_{impr,road}$) <$threshold_{predefined}$ applies, wherein a $threshold_{predefined}$ is a predefined threshold, for example a positive predefined threshold close to 0.

$$\text{Error measure } (A_{road}(B_{current,ns}, p_{Aroad}) - B_{impr,road}) \to 0$$

can also be expressed as illustrated above as:

$$\text{Error measure } (A_{road}(B_{diff,ns} + B_{original,ns}, p_{Aroad}) - B_{impr,road}) \to 0$$

wherein with such an error function, optimization towards the noise-suppression differential image $B_{diff,ns}$ is optimized.

A suitable error measure for a two-dimensional binary image can be, for example, the sum of the absolute differences of all corresponding pixels of $A_{road}$ ($B_{current,ns}$, $p_{Aroad}$) and $B_{impr,road}$. Or the error measure can be the sum of all squares of the respective difference of all corresponding pixels of $A_{road}$ ($B_{current,ns}$, $p_{Aroad}$) and $B_{impr,road}$. Or the error measure can be the sum of all roots of the square of the respective difference of all corresponding pixels of $A_{road}$ ($B_{current,ns}$, $p_{Aroad}$) and $B_{impr,road}$.

If, for example, all pixel positions are considered for both images and for these pixel values at this pixel position the difference will be formed and for this difference, for example, either the absolute amount of this difference or the square of this difference or the root of the square of this difference is determined. The results for all pixel positions are summed up to obtain the error measure.

Such error measures are also applicable when the two compared images are two gray scale images.

Respective error measures can also be used, in a modified manner, for two RGB images, under the condition that one sum each can be formed for corresponding red value pixel, one sum for corresponding gray scale pixel and one sum for corresponding blue value pixel and the three sums are then summed up to form the error measure.

Analogously, a suitable error measure for comparing two scalar values can be the absolute amount of their difference or the square of their difference or the root of the square of their difference.

The optimization of predecessor data described herein by using an error function in dependence on the generated data of a unit and in dependence on improved data received by a successor unit 165 can be applied to any units with any data.

Analogously, the third unit can also adapt the parameters of its algorithm for road detection: For this, in the above error function, instead of a current noise-suppressed image $B_{current,ns}$, the originally obtained noise-suppressed image $B_{original,ns}$ is used and instead of static parameters $p_{Aroad}$ of the algorithm for road detection, the parameters of the algorithm for road detection are the variable amount that is to be optimized. The above error function is therefore modified to:

$$\text{Error measure } (A_{road}(B_{original,ns}, p_{Aroad}) - B_{impr,road}) \to 0$$

And now $p_{Aroad}$ is optimized, wherein $A_{road}$, $B_{original,ns}$, $B_{impr,road}$ are known and remain static during the optimization.

The optimization of parameters of an algorithm of a unit for generating data described herein for a successor unit 165 by using an error function in dependence on the generated data of a unit and in dependence on the improved data obtained by a successor unit 165 can be applied to any units with any data.

In the described example, subsequently, the determined noise-suppression differential image is returned to the second interface by the third interface. Returning a differential image is particularly advantageous as this frequently saves data rate. Here, in this example, only different values of gray scale pixels that have to be adapted are to be returned.

Advantageously, the determined differential image can be quantized by the third interface before returning the same to the second interface. In the easiest case, differential gray scale pixels whose value does not exceed a predefined threshold are quantized to 0. In further embodiments, groups of different thresholds can be quantized to a common threshold. For example, for gray scale differential values, the following could be defined: Differential value −2, −1, 0, 1, 2 is quantized to 0; Differential value 3, 4, 5, 6, 7 is quantized to 5; Differential value −3, −4, −5, −6, −7 is quantized to −5; Differential value 8, 9, 10, 11, 12 is quantized to 10; Differential value −8, −9, −10, −11, −12 is quantized to −10; etc. . . . On the one hand, such a quantizing saves data rate and is frequently acceptable, as the improved differential image is merely an estimation by the error function or loss function.

In response to receiving the noise-suppression differential image, the second interface component can proceed analogously to the third and fourth interface component: From the noise-suppression differential image, it can be inferred that, on the one hand, the algorithm for noise suppression of the second unit is to be improved and/or that the RGB camera image itself, generated by the first unit and transferred to the second unit, had been erroneous.

Again, in the second unit, one or several parameters of the algorithm for noise suppression can be adapted, such that in response to receiving the camera image, the improved noise-suppressed image is generated. The improved noise-suppressed image itself can be determined from the (original) noise-suppressed image and the obtained noise-suppression differential image. As already described above, an error function or loss function can be used for this. Instead of generating the improved noise-suppressed image, it is also possible to use the noise-suppression differential image $B_{difference,ns}$ directly in an error function, as the original noise-suppressed image $B_{original,ns}$ is known and the relationship to the improved noise-suppressed image $B_{impr,ns}$ can be defined by: $B_{impr,ns,}=B_{original,ns}+B_{diff,ns}$.

Further, the obtained RGB camera image can be improved by aiming at obtaining the improved noise-suppressed image by optimizing an error function or loss function, wherein either the previous or the adapted parameters of the algorithm for noise suppression are used in the second unit. The improved camera image is again generated in the data dimension of the originally obtained RGB camera image, in the example 1200×900 red value pixel, 1200×900 gray scale pixel and 1200×900 blue value pixel. Instead of the improved camera image, again, a camera differential image can be determined directly by using an error function or loss function. The camera differential image can then be returned to the first interface component by the second interface component, wherein optionally the camera differential image can have been quantized before.

Upon receiving the camera differential image at the first interface component, it can be inferred at the first interface component that one or several camera parameters are to be optimized. For example, by one or several parameters, adjustment of the camera aperture and/or an autofocus of the camera and/or a color filter used by the camera could be optimized. Again, an error function or loss function can be used for this.

It is particularly advantageous that an interface component does not need any knowledge about the algorithm that has been used in the predecessor component for generating the data. Instead, an error function or loss function can be used and the same is optimized for the improved data provided by the successor component, wherein a first error function or loss function can be used for improving the own parameters of the respective unit and wherein a second error function or loss function can be used for determining improved input data, wherein the improved input data improve the original input data that have been generated by the predecessor unit 95.

A further embodiment relates, for example, to a computer-tomography reconstruction:

A first unit is, for example, a configurable X-ray device generating a plurality of two-dimensional X-ray images, wherein each of the two-dimensional X-ray images is, for example, a gray scale image. A first interface component is associated with the first unit.

A second unit is a first image improvement unit that is configured to compensate stray radiation in the plurality of the two-dimensional X-ray images to obtain a plurality of stray radiation-compensated images. A second interface component is associated with the second unit.

A third unit is configured to detect and correct defective pixels in the plurality of stray radiation-compensated images, for example, by interpolating adjacent pixels of the defective pixels. The third unit generates a plurality of defective pixel-corrected images. A third interface component is associated with the third unit.

A fourth unit reconstructs, from the plurality of defective pixel-corrected images, a single two-dimensional computer-tomography layer image that represents an (almost) arbitrarily selectable cut through the body of the patient. A fourth interface component is associated with the fourth unit.

A fifth unit identifies suspicious regions in the computer-tomography layer image and outputs a list identifying each of the identified suspicious regions at least by their position. For this, conventional pattern recognition technologies are used, which compare, for example, whether a region is equal to or at least similar to a stored problematic pattern. A controlled unit can report to the fifth unit how many of the previously determined suspicious regions have been detected correctly by the fifth unit (e.g., 7 of 8 suspicious regions detected correctly).

In another embodiment, a two-dimensional binary image is provided where the suspicious regions are indicated, for example, by 1, while unsuspicious regions are indicated, for example, by 0. In such an embodiment, the control unit can return, for example, a two-dimensional binary differential image in which the correctly detected pixels are indicated by 0 and the erroneously indicated regions are indicated by 1.

A fifth interface component is associated with the fifth unit.

The feedback and optimizations are, for example, analogous to the above example for driver assistance systems or systems for supporting autonomous driving.

In the fifth unit, one or several parameters of the pattern recognition algorithm for recognizing the problematic regions are improved or optimized in dependence on the feedback result of the control unit. For this, for example, an analogous error function or loss function can be used. Additionally, a differential image is determined between an improved computer-tomography layer image and the obtained computer-tomography layer image in dependence on the feedback of the control unit and returned to the fourth interface component by the fifth interface component.

In the fourth unit, one or several parameters of the algorithm for generating the computer-tomography layer image are improved or optimized in dependence on the improved computer-tomography layer image provided by the fifth interface component. For this, for example, an analogous error function or loss function can be used. Additionally, a plurality of differential images are returned to the third interface component by the fourth interface component, wherein each of the plurality of differential images represents a differential image between an improved defective pixel-corrected image and an obtained defective pixel-corrected image.

In the third unit, one or several parameters of the algorithm for defective pixel correction are improved or optimized in dependence on the plurality of differential images provided by the fourth interface component. For this, for example, a respective error function or loss function can be used. Additionally, a plurality of further differential images are returned to the second interface component by the third interface component, wherein each of the plurality of further differential images represents a differential image between an improved stray radiation-compensated image and an obtained stray radiation-compensated image.

In the second unit, one or several parameters of the algorithm for stray radiation correction are improved or optimized in dependence on the plurality of differential images provided by the third interface component. Again, for example, for this, a respective error function or loss function can be used. Additionally, a plurality of differential images are returned to the first interface component by the second interface component, wherein each of the plurality of differential images represents a differential image between an improved X-ray image and an obtained X-ray image.

In the first unit, one or several parameters of the configurable X-ray device are improved or optimized in dependence on the plurality of differential images provided by the second interface component. Again, for example, a respective error function or loss function can be used for this.

A further embodiment relates, for example, to a vibration sensor in a gas plant used for temperature measurement.

A first unit is, for example, the configurable vibration sensor, which continuously measures a strength of the vibration in dependence on its configuration, and outputs a time series signal. Here, the time series signal indicates a strength of the vibration for each time of the time series. A first interface component is associated with the first unit.

A second unit is a first noise-suppression unit transforming the time series signal into the frequency range (e.g., by means of Fourier transformation) to obtain a vibration signal in the frequency domain, which performs noise suppression and then retransforms the noise-suppressed vibration signal into the time domain. The transformation into the frequency domain and the subsequent retransformation into the time domain can be, for example, performed in a configurable manner. For example, the number of frequency channels and their center frequency can be adjusted. Further, the noise suppression algorithm in the frequency domain can be adjustable. A second interface component is associated with the second unit.

A third unit is a temperature prediction unit that is configured to predict a temperature in the gas plant in dependence on a noise-suppressed signal in the time domain. For this, the third unit can use machine learning. For example, a neuronal network can be used, which obtains, as input, a series of values of the noise-suppressed signals and estimates, as output the temperature in the gas plant in dependence on the current (training) state of the neuronal network. Instead of a neuronal network, for example, a support vector machine can be used. A third interface component is associated with the third unit.

A control unit can now report back, for example, an actual temperature or temperature difference to the third interface unit, which indicates how much the temperature estimated by the third unit deviates from an actual temperature in the gas plant.

The feedback and optimizations are again analogous to the above-described examples for driver assistance systems or systems for supporting autonomous driving and for computer-tomography reconstruction:

In the third unit, the neuronal network or the support vector machine is improved or optimized in dependence on the temperature difference provided by the control unit. For example, in a neuronal network, a new test data set can be formed, which comprises the series of values of the noise-suppressed signal as input values and the actual temperature in the gas plant as output value. With this further test data set, the neuronal network can be trained further. Additionally, as in the above examples, an error function or loss function can be used to determine an improved noise-suppressed signal in dependence on the neuronal network or the support vector machine and in dependence on the actual temperature, or to determine a differential signal between the improved noise-suppressed signal and the received noise-suppressed signal. Then, the improved noise-suppressed signal or the differential signal is returned to the second interface by the third interface.

In the second unit, one or several parameters of the noise-suppression algorithm and/or one or several parameters of the time/frequency transformation are improved or optimized in dependence on the improved noise-suppressed signal provided by the third interface component or in dependence on the provided differential signal. Again, for example, a respective error function or loss function can be used for this. Additionally, for example, a differential signal is returned to the first interface component by the second interface component, which represents a differential signal between an improved time series signal and the obtained time series signal, which can again have been determined by means of error function or loss function.

In the first unit, one or several parameters of the configurable vibration sensors are improved or optimized in dependence on the differential signal provided by the second interface component. Again, for example, a respective error function or loss function can be used for this.

In the following, a possible coordination between interface component and associated unit according to an embodiment will be described exemplarily with respect to the above-described third unit of the example for driver assistance systems or systems for supporting autonomous driving:

As described above, it is the primary object of the third unit to generate a current road-detected image $B_{road}$ from a noise-suppressed image $B_{ns}$. This takes place by applying the algorithm $A_{road}$ for road detection of the third unit according to:

$$B_{road} = A_{road}(B_{ns}, p_{Aroad}),$$

wherein $p_{Aroad}$ indicates the one or several parameters of the algorithm for road detection.

Such a third unit could, for example, offer the following functions for calling:

- transfer_noise-suppression_image($B_{ns}$): sets a noise-suppressed image $B_{ns}$ as current noise-suppressed image
- get_road-detected_image( ): provides a road-detected image $B_{road}$ for a current noise-suppressed image $B_{ns}$, in dependence on the current parameters of the algorithm for road detection
- transfer_parameter($p_{Aroad}$): re-determines the parameters of the algorithm for road detection
- get_parameter( ): provides the current parameters of the algorithm for road detection In such a configuration, the fourth unit can fetch from the third unit by calling get_road-detected_image( ), such that the road-detected image $B_{road}$ for a current noise-suppressed image $B_{road}$ is returned.

An inventive third interface component should support the following functions in one embodiment:

In one example, the third interface component should obtain, from the fourth interface component, for a specific road-detected image, an improved road-detected image or a differential image between the improved road-detected image and the specific road-detected image.

This can, for example, take place in that the fourth interface component calls a respective function or method of the third interface component, for example, by indicating an identifier, which indicates to what received road-detected image the improved road-detected image relates.

Or the third interface component requests, for example, proactively by calling a respective function or method of the fourth interface component, the transmission of an improved road-detected image for an original road-detected image, which is, for example, characterized by an identifier (e.g., an integer).

The third interface component should improve or optimize the parameters of the algorithm for road detection based on the improved road-detected image or the respective differential image. For this, the third interface implements, for example:

$$\text{error measure } (A_{road}(B_{original,ns}, p_{Aroad}) - B_{impr,road}) \rightarrow 0$$

wherein $p_{Aroad}$ is optimized and wherein $A_{road}$, $B_{original,ns}$, $B_{impr,road}$ are known and remain static during optimization.

Here, the third interface component can proceed as illustrated in the following pseudo code:

```
as long as (1 <> 0) {
  p_Aroad = third_interface component_selects_new_parameter( );
  transfer_parameter(p_Aroad);
  B_road = get_road-detected_image ( );
  if error measure (B_road − B_impr,road) < threshold1_predefined {
    terminate_endless loop;
  }
}
```

wherein, within the function third_interfacecomponent_select_new_parameter( ) implemented by the third interface component, suitable new parameter values are selected for $p_{Aroad}$ during the improvement/optimization of the error function/loss function and wherein terminate_endless loop terminates the endless loop "as long as (1< >0)", if the error measure is smaller than a predefined first threshold $threshold1_{predefined}$. In this case, the respective improved parameters $p_{Aroad}$ are found and the parameters of the algorithm for road detection have already been correctly adjusted with the last adjustment "transfer_parameter($p_{Aroad}$)".

Further, the third interface component should determine an improved noise-suppressed image $B_{impr,ns}$ or a respective differential image. For this, the third interface component improves/optimizes, for example, the error measure:

$$\text{error measure } (A_{road}, B_{impr,ns}, p_{Aroad}) - B_{impr,road}) \to 0$$

wherein the improved noise-suppressed image $B_{impr,ns}$ is improved or optimized and wherein $A_{road}$, $p_{Aroad}$, $B_{impr,road}$ are known and remain static during optimization.

Here, the third interface component can proceed as illustrated in the following pseudo code:

```
as long as (1<>0) {
  B_impr,ns = third_interfacecomponent_select_new_noise-suppressed_image( );
  transfer_noises-uppressed_image(B_impr,ns)
  B_road = get_road-detected_image( );
  if error measure (B_road - B_impr,road) < threshold2_predefined {
    terminate_endless loop;
  }
}
```

wherein, within the function third_interfacecomponent_selects_new_noisesuppressed_image( ) implemented by the third interface component, the third interface component selects a suitable new noise-suppressed image within the improvement/optimization of the error function/loss function and wherein terminate_endlessloop terminates the endless loop "as long as (1< >0)" if the error measure is smaller than a predefined second threshold $threshold2_{predefined}$. In that case, the improved noise-suppressed image is found and stored in $B_{impr,ns}$.

Finally, the third interface component should output the determined improved noise-suppressed image $B_{impr,ns}$, in particular, to the second interface component.

This can, for example, take place in that the third interface component calls a respective function or method of the second interface component, for example, by indicating an identifier that indicates to which received noise-suppressed image the improved noise-suppressed image relates.

Or the second interface component requests, for example, in a proactive manner, by calling a respective function or method of the third interface component, the transmission of an improved noise-suppressed image for an original noise-suppressed image which is characterized, for example, by an identifier (e.g., an integer).

From the above example, it becomes clear that an inventive interface component can be provided for any associated units which can use, for example, functions or methods that are provided by the associated unit 150 anyway.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Interface component, comprising:

a parameter determination unit configured to determine one or more configuration parameters of an associated unit of a distributed system depending on first feedback data of a successor interface component, and configured to change a configuration of the associated unit by means of the one or more configuration parameters; and a feedback determination unit configured to determine second feedback data and transfer the second feedback data to a predecessor interface component, wherein the first feedback data depends on previous output data of the associated unit, wherein the first feedback data is suitable to change the previous output data to acquire changed output data, or wherein the first feedback data indicates the changed output data, wherein the feedback determination unit is configured to determine the second feedback data such that the second feedback data depends on the first feedback data, wherein the second feedback data is suitable for changing previous input data for the associated unit, or wherein the second feedback data indicates changed input data for the associated unit, wherein the previous input data is data or depends on data that has been captured or measured by means of a technical device; or wherein the associated unit is a technical device whose technical configuration is set by one or more configuration parameters; or wherein the second feedback data is configured to contribute to a change of one or more further configuration parameters of a technical configuration of a technical device.

2. Interface component according to claim 1, wherein the interface component is configured to receive the previous output data from the associated unit, and wherein the interface component is configured to transmit the previous output data to a successor interface component that is associated with a successor.

3. Interface component according to claim 2, wherein the previous output data is determined for the successor unit to which the successor interface component is associated, and wherein the interface component is configured to transmit the previous output data to the successor interface component that is associated with a successor unit for forwarding the previous output data to the successor unit.

4. Interface component according to claim 1, wherein the interface component is configured to receive the previous input data from a predecessor interface component that is associated with a predecessor unit.

5. Interface component according to claim 4, wherein previous input data has been generated by the predecessor unit, with which the predecessor interface component is associated, and have been transmitted to the predecessor interface component for forwarding to the interface component, wherein the interface component is configured to receive the previous input data from the predecessor interface component; or wherein the interface component is configured to transmit the previous input data to the associated unit; or wherein the previous input data has been generated by the predecessor unit to which the predecessor interface component is associated, and have been transmitted to the predecessor interface component for forwarding to the interface component, wherein the interface component is configured to receive the previous data from the predecessor interface component, wherein the previous input data has been transmitted directly to the associated unit by the predecessor unit, and wherein the interface component is configured to not transmit the previous input data to the associated unit.

6. Interface component according to claim 1, wherein the feedback determination unit is configured to determine the second feedback data such that the second feedback data depends on the first feedback data and on the previous input data for the associated unit; or wherein the feedback determination unit is configured to generate the second feedback data depending on the one or more configuration parameters; or wherein the feedback determination unit is configured to generate the second feedback data depending on the one or more configuration parameters after the one or more configuration parameters have been changed by the parameter determination unit; or wherein the feedback determination unit is configured to generate the second feedback data by using machine learning; or wherein the feedback determination unit is configured to generate the second feedback data as differential data that indicates a difference between the changed input data and the previous input data, or wherein the feedback determination unit is configured to determine the second feedback data such that the second feedback data indicates a first or higher derivation that depends on the changed input data and on the original input data.

7. Interface component according to claim 1, wherein the feedback determination unit is configured to determine the second feedback data depending on first feedback data and depending on which output data the associated unit generates in response to receiving different input data.

8. Interface component according to claim 7, wherein the feedback determination unit is configured to determine the second feedback data depending on the first feedback data and depending on which output data the associated unit generates in response to receiving the different input data with the configuration held constant by means of one or more configuration parameters held constant; or wherein the feedback determination unit is configured to determine the second feedback data depending on an error function or a loss function.

9. Interface component according to claim 1, wherein the parameter determination unit is configured to determine the one or more configuration parameters of the associated unit depending on the first feedback data and depending on which output data the associated unit generates with different configurations by means of different one or more configuration parameters.

10. Interface component according to claim 9, wherein the parameter determination unit is configured to determine the one or more configuration parameters of the associated unit depending on the first feedback data and depending on which output data the associated unit generates in response to receiving input data that is kept constant with different configurations by means of different one or more configuration parameters; or wherein the parameter determination unit is configured to determine the one or more configuration parameters depending on an error function or a loss function.

11. Interface component according to claim 1, wherein the previous input data is been generated by a predecessor unit to which a predecessor interface component is associated and have been transmitted to the associated unit directly by the predecessor unit, wherein the interface component is configured to receive the previous input data from the associated unit; or wherein the feedback determination unit is configured to use quantization for generating the second feedback data; or wherein the parameter determination unit is configured to generate the one or more configuration parameters by using machine learning; or wherein the parameter determination unit is configured to generate the one or more configuration parameters as differential data that indicates a difference between the changed input data and the previous input data, or wherein the parameter determination unit is configured to determine the second feedback data such that the second feedback data indicates a first or higher derivation that depends on the changed input data and on the original input data; or wherein the interface component is configured to associate the first feedback data based on an identifier of the previous output data; or wherein the feedback determination unit is configured to output an identifier that indicates to which previous input data the second feedback data relate; or wherein the previous input data and the changed input data are two-dimensional or higher-dimensional data; or wherein the previous output data and the changed output data are two-dimensional or higher-dimensional data; or wherein the previous input data and the changed input are two-dimensional image data; or wherein the previous output data and the changed output data are two-dimensional image data; or wherein the previous input data and the changed input data are audio data; or wherein the previous output data and the changed output data are audio data; or wherein the previous input data and the changed input data are data in the frequency range; or wherein the previous output data and the changed output data are data in the frequency domain; or wherein the previous input data and the changed input data are data of a pressure sensor; or wherein the interface component is realized as plug; or wherein the associated unit is a technical device for capturing or measuring, whose technical configuration is set by the one or more configuration parameters.

12. Interface component according to claim 1, wherein the parameter determination unit is configured to determine the one or more configuration parameters of the associated unit of the distributed system depending on further first feedback data of a further successor interface component, wherein the feedback determination unit is configured to determine further second feedback data and to transmit the further second feedback data to a further predecessor interface component, wherein the further first feedback data depends on further previous output data of the associated unit, wherein the further first feedback data is suitable to change the further previous output data to acquire further changed output data, or wherein the further first feedback data indicates the further changed output data, wherein the feedback determination unit is configured to determine the further second feedback data such that the further second feedback data depends on the further first feedback data, wherein the further second feedback data is suitable for changing further previous input data for the associated unit, or wherein the further second feedback data indicates further changed input data for the associated unit.

13. Apparatus, comprising:

an interface component; and an associated unit, wherein the interface component and the associated unit are associated with each other, wherein the interface component, comprises:

a parameter determination unit configured to determine one or more configuration parameters of the associated unit of a distributed system depending on first feedback data of a successor interface component, and configured to change a configuration of the associated unit by means of the one or more configuration parameters; and a feedback determination unit configured to determine second feedback data and transfer the second feedback data to a predecessor interface component, wherein the first feedback data depend on previous output data of the associated unit, wherein the first feedback data is suitable to change the previous output data to acquire changed output data, or wherein the first feedback data indicates the changed output data, wherein the feedback determination unit is configured to determine the second feedback data such that the second feedback data depends on the first feedback data, wherein the second feedback data is suitable for changing previous input data for the associated unit, or wherein the second feedback data indicates changed input data for the associated unit, wherein the previous input data is data or depends on data that has been captured or measured by means of a technical device; or wherein the associated unit is a technical device whose technical configuration is set by one or more configuration parameters; or wherein the second feedback data is configured to contribute to a change of one or more further configuration parameters of a technical configuration of a technical device.

14. System, comprising:

an interface component;

an associated unit, wherein the interface component and the associated unit are associated with each other;

a predecessor interface component; and a successor interface component, wherein the interface component, comprises:

a parameter determination unit configured to determine one or more configuration parameters of the associated unit of a distributed system depending on first feedback data of the successor interface component, and configured to change a configuration of the associated unit by means of the one or more configuration parameters; and a feedback determination unit configured to determine second feedback data and transfer the second feedback data to the predecessor interface component, wherein the first feedback data depends on previous output data of the associated unit, wherein the first feedback data is suitable to change the previous output data to acquire changed output data, or wherein the first feedback data indicates the changed output data, wherein the feedback determination unit is configured to determine the second feedback data such that the second feedback data depends on the first feedback data, wherein the second feedback data is suitable for changing previous input data for the associated unit, or wherein the second feedback data indicates changed input data for the associated unit, wherein the previous input data is data or depends on data that have been captured or measured by means of a technical device; or wherein the associated unit is a technical device whose technical configuration is set by one or more configuration parameters; or wherein the second feedback data is configured to contribute to a change of one or more further configuration parameters of a technical configuration of a technical device.

15. System, comprising:

a plurality of apparatuses comprising a first apparatus, a second apparatus and a third apparatus, wherein each of the plurality of apparatuses comprises:

an interface component; and an associated unit, wherein the interface component and the associated unit are associated with each other, wherein the interface component, comprises:

a parameter determination unit configured to determine one or more configuration parameters of the associated unit of a distributed system depending on first feedback data of the successor interface component, and configured to change a configuration of the associated unit by means of the one or more configuration parameters; and a feedback determination unit configured to determine second feedback data and transfer the second feedback data to the predecessor interface component, wherein the first feedback data depends on previous output data of the associated unit, wherein the first feedback data is suitable to change the previous output data to acquire changed output data, or wherein the first feedback data indicates the changed output data, wherein the feedback determination unit is configured to determine the second feedback data such that the second feedback data depends on the first feedback data, wherein the second feedback data is suitable for changing previous input data for the associated unit, or wherein the second feedback data indicates changed input data for the associated unit, wherein the previous input data is data or depends on data that have been captured or measured by means of a technical device; or wherein the associated unit is a technical device whose technical configuration is set by one or more configuration parameters; or wherein the second feedback data is configured to contribute to a change of one or more further configuration parameters of a technical configuration of a technical device;

wherein the associated unit of the first apparatus is a predecessor unit of the associated unit of the second apparatus, wherein the associated unit of the third apparatus is a successor unit of the associated unit of the second apparatus, wherein the interface component of the third apparatus is configured to transmit its second feedback data to the interface component of the second apparatus, which is received by the interface component of the second apparatus as first feedback data, and wherein the interface component of the second apparatus is configured to transmit its second feedback data to the interface component of the first apparatus, which is received by the interface component of the first apparatus as first feedback data.

16. System according to claim 15, wherein the interface component of the second apparatus is an interface component, wherein the parameter determination unit is configured to determine the one or more configuration parameters of the associated unit of the distributed system depending on further first feedback data of a further successor interface component, wherein the feedback determination unit is configured to determine further second feedback data and to transmit the further second feedback data to a further predecessor interface component, wherein the further first feedback data depends on further previous output data of the associated unit, wherein the further first feedback data is suitable to change the further previous output data to acquire further changed output data, or wherein the further first feedback data indicates the further changed output data, wherein the feedback determination unit is configured to determine the further second feedback data such that the further second feedback data depends on the further first feedback data, wherein the further second feedback data is suitable for changing further previous input data for the associated unit, or wherein the further second feedback data indicates further changed input data for the associated unit, wherein the plurality of apparatuses further comprise a fourth apparatus and a fifth apparatus, wherein the interface component of the fifth apparatus is configured to transmit its second feedback data to the interface component of the second apparatus, which is received by the interface component of the second apparatus as further first feedback data, and wherein the interface component of the second apparatus is configured to transmit its further second feedback data to the interface component of the fourth apparatus, which is received by the interface component of the first apparatus as first feedback data.

17. System according to claim 14, wherein the system is a distributed system.

18. System according to claim 17, wherein the system is a distributed system comprising one or more of the subsequent components:

a web service;

one or more sensors, for example, one or more X-ray sensors or one or more X-ray sensors or one or more ultrasound sensors; one or more cameras;

Lidar;

one or more microphones;

radar;

one or more laser systems;

one or more diodes;

one or more computers with sensory components;

transmission channels for information, for example one or more telephone lines, one or more telescopes; one or more information channels in Shannon's sense; and one or more transmission channels for information with the ability of latching information, wherein temporal immediacy in the information transmission is not needed.

19. Method, comprising:

a parameter determination unit of an interface component determining one or more configuration parameters of an associated unit of a distributed system depending on first feedback data of a successor interface component and changing a configuration of the associated unit by means of the one or more parameters; and a feedback determination unit of the interface component determining second feedback data and transferring the second feedback data to a predecessor interface component, wherein the first feedback data depends on previous output data of the associated unit, wherein the first feedback data is suitable to change the previous output data to acquire changed output data, or wherein the first feedback data indicates the changed output data, wherein the feedback determination unit determines the second feedback data such that the second feedback data depends on the first feedback data, wherein the second feedback data is suitable for changing previous input data for the associated unit, or wherein the second feedback data indicates changed input data for the associated unit, wherein the previous input data is data or depends on data that has been captured or measured by means of a technical device; or wherein the associated unit is a technical device whose technical configuration is set by one or more configuration parameters; or wherein the second feedback data are configured to contribute to a change of one or more further configuration parameters of a technical configuration of a technical device.

20. A non-transitory digital storage medium having a computer program stored thereon to perform the method of claim 19, when said computer program is run by a computer.

* * * * *